(No Model.)
C. CLOSZ.
GRAIN SEPARATING SCREEN.
No. 434,247. Patented Aug. 12, 1890.
Fig. 1.
Fig. 2.
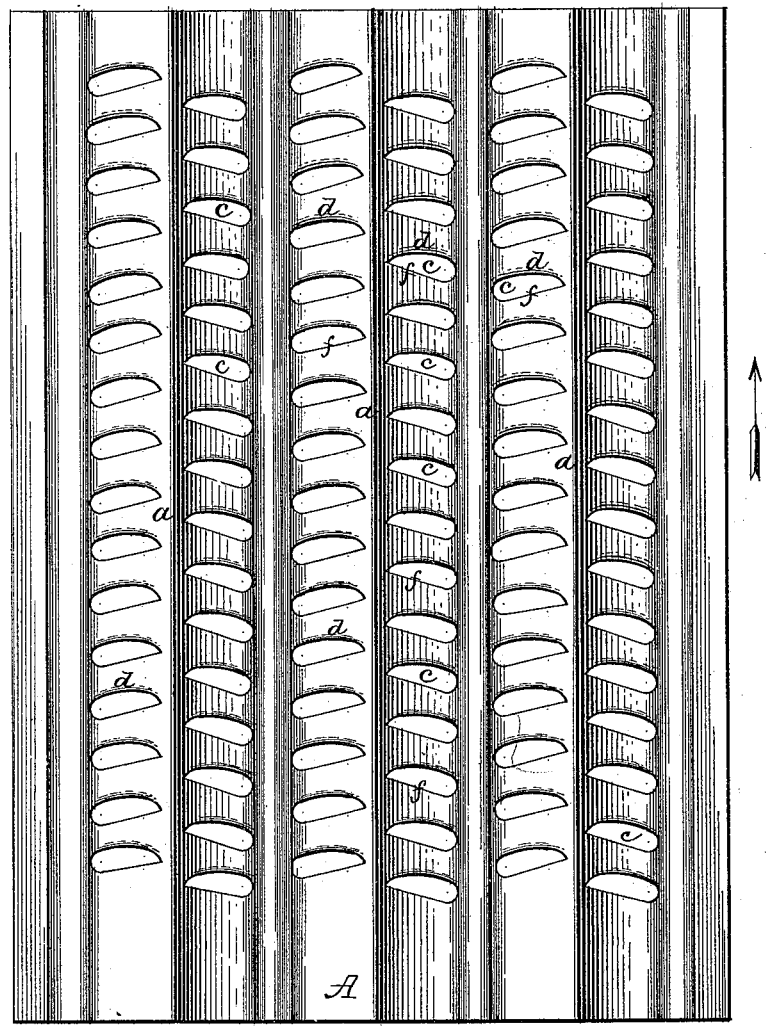
Fig. 3.
Fig. 4.
WITNESSES:
INVENTOR
Charles Closz
BY
Johnson & Johnson
ATTORNEY.

UNITED STATES PATENT OFFICE.

CHARLES CLOSZ, OF ST. ANSGAR, IOWA.

GRAIN-SEPARATING SCREEN.

SPECIFICATION forming part of Letters Patent No. 434,247, dated August 12, 1890.

Application filed May 9, 1890. Serial No. 351,151. (No model.)

*To all whom it may concern:*

Be it known that I, CHARLES CLOSZ, a citizen of the United States, residing at St. Ansgar, in the county of Mitchell and State of Iowa, have invented a new and useful Improvement in Grain-Separating Screens, of which the following is a specification.

I have improved the screen or riddle which for grain-separators is employed as a shaking platform upon which the grain is delivered for a preliminary separation from the straw and other long stuff; and my improvement is directed to a novel construction of a sheet-metal chaffing separator or screen having longitudinal corrugations, the sloping sides of which I form with openings of peculiar shape and arrangement, whereby the chaffing and separating action under the shaking motion of the platform is greatly facilitated and the straw prevented from clogging in the openings. This novel construction is illustrated in the drawings hereto annexed, and will be particularly pointed out in the claims concluding this specification.

Referring to the drawings, Figure 1 is a vertical longitudinal section of my improved shaking-screen for separating grain, taken on the line of the bottom of the angular gutter formed by the corrugations. Fig. 2 is a vertical cross-section of the same. Fig. 3 is a top view of the same, and Fig. 4 is a section of a modification.

In the drawings I have only shown the shaking-separator platform, as its illustration in connection with a thrashing or other machine is deemed unnecessary to a proper understanding of the improvement and its use in such machines.

It will be understood that the grain to be separated is delivered from a suitable conveyer or hopper upon the inner end A of the platform, and that the latter is connected to a suitable device for giving it a longitudinally-reciprocating movement, and for this purpose it may be suspended from fixed parts of the machine, or supported upon fixed ways of the frame, and that it may be set with a slight downward inclination toward the discharge end or operated in a horizontal position.

The separator-platform is of sheet metal, preferably of sheet-steel, and is formed with longitudinal corrugations $a$, standing in parallel relation and at such height and distance apart as to form gutters or channels $b$ of angular cross-section, the sloping sides of which are of the desired pitch and terminate in said gutters at the bottom. In these sloping sides I form openings $c$, of approximately almond shape, and arrange them so as to stand in a forwardly slanting or inclining relation to each other, with their largest ends terminating in the bottom of the gutters and their pointed ends extending to the ridge. I prefer to make the forward edges $d$ of these openings curved and slightly beveled inward, with a sharp forward slant $e$ at their pointed ends, and with their rear edges $f$ made straight, because I find this shape and construction to give the best operation. I find that by making these openings largest at their lowest ends and terminating these ends directly in the bottom of the gutters they free the grain better and prevent clogging at their upper ends, as whatever might collect in their small upper ends will the more readily pass down and out at the large bottom ends. In my experiments with openings of different form arranged crosswise in the sloping sides I found it necessary, to prevent the openings from being clogged or choked by the straw, to arrange them inclining toward the delivery end of the platform; to make their lower ends circular and to lessen them in width toward the ridge; to make their rear edges straight and their front edges curved and slightly beveled downward. The enlarged and rounded ends of the openings terminate in the bottom of the gutter and will let the grain pass freely through them, while the straw and other long stuff will ride higher up the sloping sides, where the openings are made narrower and the straw is not so liable to catch therein. The curving of the forward edges of the openings and slightly beveling them inward also serves to cause the straw to move over the openings without catching. When the sloping sides of all the corrugations are made with the almond-shaped openings, as I have described, they are alternated in the opposite sides, so that their enlarged rounded ends will practically form a continuous open gutter, as seen in Fig. 4.

When the platform is made with alternate solid corrugations, as seen in Fig. 2, they are of less height and of greater pitch than those having the openings, and such construction gives a free movement of both the grain and the straw.

I claim as my improvement—

1. A screen for grain-separators, constructed of a sheet-metal platform corrugated and having approximately almond-shaped openings in the sloping sides of said corrugations and arranged in forward slanting or inclined relation to each other, with their enlarged rounded ends terminating in the bottoms of the gutters formed by said corrugations, as shown and described.

2. The sheet-metal platform herein described, formed with longitudinal corrugations of V shape in cross-section and having openings in their sloping sides enlarged and rounded at their lower ends, pointed at their upper ends, straight at their rear edges and curved at their front edges and arranged in forward slanting or inclined relation to each other, as shown and described.

3. The sheet-metal platform herein described, formed with longitudinal corrugations of V shape in cross-section, each alternate corrugation being of less pitch and greater height and having approximately almond-shaped openings in their sloping sides, the enlarged rounded ends whereof terminate in the bottom of the gutters, and the said openings slanting or inclining forward, the corrugations of less height and greater pitch being solid, as shown and described.

In testimony whereof I have hereunto set my hand in the presence of two subscribing witnesses.

CHARLES CLOSZ.

Witnesses:
A. E. H. JOHNSON,
PHILIP F. LARNER.